(12) United States Patent
Flores

(10) Patent No.: US 9,295,929 B2
(45) Date of Patent: Mar. 29, 2016

(54) METHOD FOR WASHING A FILTER HAVING AT LEAST TWO LAYERS OF FILTERING MEDIA, IN PARTICULAR FOR FILTERING SEAWATER, AND EQUIPMENT FOR IMPLEMENTING SAID METHOD

(71) Applicant: DEGREMONT, Paris la Defense (FR)

(72) Inventor: Gerard Flores, Paris (FR)

(73) Assignee: DEGREMONT (FR)

( * ) Notice: Subject to any disclaimer, the term of this patent is extended or adjusted under 35 U.S.C. 154(b) by 0 days.

(21) Appl. No.: 14/376,051

(22) PCT Filed: Jan. 29, 2013

(86) PCT No.: PCT/IB2013/050750
§ 371 (c)(1),
(2) Date: Jul. 31, 2014

(87) PCT Pub. No.: WO2013/114275
PCT Pub. Date: Aug. 8, 2013

(65) Prior Publication Data
US 2015/0008195 A1    Jan. 8, 2015

(30) Foreign Application Priority Data
Feb. 1, 2012 (FR) ...................... 12 50926

(51) Int. Cl.
*B01D 24/16* (2006.01)
*B01D 24/48* (2006.01)
*B01D 24/00* (2006.01)
*B01D 24/12* (2006.01)
*B01D 24/46* (2006.01)
*B01D 24/14* (2006.01)

(52) U.S. Cl.
CPC ............ *B01D 24/4631* (2013.01); *B01D 24/14* (2013.01); *B01D 24/4636* (2013.01); *B01D23/16* (2013.01); *B01D 23/20* (2013.01); *B01D 23/24* (2013.01); *B01D 24/12* (2013.01); *B01D 24/4869* (2013.01); *B01D 2101/04* (2013.01); *B01D 2201/08* (2013.01); *B01D 2201/081* (2013.01); *B01D 2201/087* (2013.01)

(58) Field of Classification Search
CPC .......... B01D 24/4636; B01D 24/4631; B01D 24/46; B01D 24/00; B01D 24/14; B01D 24/10; B01D 24/02; B01D 2201/08; B01D 2201/00; B01D 24/4869; B01D 23/16; B01D 23/10; B01D 23/20; B01D 23/24; B01D 23/26; B01D 41/02; B01D 41/00; B01D 2201/081; B01D 2201/087; B01D 2101/04; B01D 24/12
USPC ......... 210/794, 793, 792, 791, 618, 797, 798, 210/150, 151, 221.2, 221.1, 220, 209, 274, 210/807, 290
See application file for complete search history.

(56) References Cited

U.S. PATENT DOCUMENTS

| | | | |
|---|---|---|---|
| 3,698,554 A | 10/1972 | Mail | |
| 4,076,625 A * | 2/1978 | Scholten et al. | 210/274 |
| 4,191,652 A * | 3/1980 | Whitmore | 210/274 |
| 4,322,299 A | 3/1982 | Scholten et al. | |
| 5,286,392 A * | 2/1994 | Shea | 210/793 |
| 5,750,041 A * | 5/1998 | Hirane | 210/795 |
| 2003/0183570 A1* | 10/2003 | Takarabe | 210/267 |

FOREIGN PATENT DOCUMENTS

DE        8916199        2/1995

OTHER PUBLICATIONS

International Search Report PCT/IB2013/050750 dated May 27, 2013.

* cited by examiner

*Primary Examiner* — David C Mellon
*Assistant Examiner* — Liam Royce
(74) *Attorney, Agent, or Firm* — The Belles Group, P.C.

(57) ABSTRACT

The invention relates to a method for washing a filter (F) having at least two layers of filtering media (4, 5) for raw water containing components having a tendency to form cakes (M), in particular for seawater, the layers of filtering media being supported by a base (6) comprising pass-through openings and provided with nozzles (6a) enabling air and/or wash water to be injected, the raw water flowing through the layers from top to bottom and the treated water being recovered at the lower portion of the filter, and which comprises at least one spillway (D) at the upper portion thereof for collecting the wash water. The method includes the following series of steps: a) the raw water intake (2) is closed, followed by the filtration outlet valve (13), the filter is depressurized, and the filter cake is broken; b) the water level in the filter is lowered; c) only pressurized air is blown into the lower portion of the filter, said air passing through the layers of the filter from bottom to top and causing the cakes to be reduced to particles, in particular by means of friction; d) rinsing is carried out from bottom to top using only water, the water rinsing time being sufficiently short to ensure that the water level stops below the level of the upper edge of the wash water collection spillway; e) the filter water is emptied once again by discharging same from the lower portion of the filter; f) steps c), d) and e) are repeated at least once, and a final rinsing is carried out by injecting a quantity of backwashing water through the bottom portion of the filter, which is then discharged from the upper portion of the filter via a pipe (14).

9 Claims, 1 Drawing Sheet

METHOD FOR WASHING A FILTER HAVING AT LEAST TWO LAYERS OF FILTERING MEDIA, IN PARTICULAR FOR FILTERING SEAWATER, AND EQUIPMENT FOR IMPLEMENTING SAID METHOD

PRIORITY

Priority is claimed as a national stage application, under 35 U.S.C. §371, to international application No. PCT/IB2013/050750, tiled Jan. 19, 2013, which claims priority to French application FR1250926, filed Feb. 1, 2012. The disclosures of the aforementioned priority applications are incorporated herein by reference in their entirety.

The invention relates to a method for washing a filter having at least two layers of filter media for a raw water containing components that have a tendency to form cakes or "mud balls" which generally agglomerate at the surface of the filter, notably for seawater. The layers of filter median are supported by a floor comprising passage orifices and provided with nozzles that allow an injection of washing water and/or air, the raw water flowing from top to bottom through the layers, and the treated water being collected at the bottom part of the filter, which at the top part comprises at least one weir for collecting the washing water.

The layers of filter media often comprise at least one layer of sand and one layer of anthracite or some other medium such as pumice stone.

When the raw water treated, particularly seawater, contains derived products such as alginates, or natural polymers, treating the water with coagulant, such as ferric chloride ($FeCl_3$) gives rise to sort of cakes or "mud balls" caused by the agglomeration of particles of media which is probably brought about by various natural flocculants contained in the water, notably the alginates. These cakes may reach dimensions of around 2 cm×4 cm with a thickness of around 0.5 cm.

The formation of these cakes disrupts the operation of the filter and entails relatively long rinsing or washing operations, it being possible for rinsing to take up to several hours and in some cases it can even become impossible to remove these cakes. This results in an appreciable reduction in the filtered water production output. Furthermore, conventional washing operations generally give rise to a loss of media as the media is discharged with the washing water.

It is a key objective of the invention to provide a washing method for filters of the type defined hereinabove that makes it possible to reduce the duration of the washing operation while at the same time preserving the quantity of media and the way in which such media are arranged through the filter.

The invention is as applicable to filters that operate under pressure as is it to atmospheric filters.

According to the invention, the method for washing a filter of the kind defined hereinabove is characterized in that the following successive steps are carried out:
  a/ a preparation step in which the raw water inlet, is closed and the filter, where the latter operates under pressure, is depressurized;
  b/ the water level in the filter is lowered;
  c/ air alone is blown under pressure into the bottom part of the filter, this air passing from bottom to top through the layers of the filter and causing the cakes to be reduced to particles, particularly by friction;
  d/ rinsing is carried out using water alone, from bottom to top, allowing the media to separate and causing the particles to rise to the surface, the water-rinsing time being short enough that the water level stops rising below the level of the upper edge of the washing water collection weir;
  e/ the water is emptied out of the filter again by a discharge at the bottom part;
  f/ steps c/, d/ and e/ are repeated at least once,
  and a final rinsing is performed by passing through a quantity of backwash water which is injected at the bottom part of the filter and discharged from the top part of the filter by a pipe.

For preference, steps c/, d/ and e/ are repeated at least twice.

The blowing-in of air alone is also referred to as the bubbling step, Advantageously, the duration for which air alone is blown in is less than 10 min.

The duration of the rinsing with water alone may be less than 60 s, in particular around 45 s.

Prior to each rinsing with water alone, the cushion of air under the floor is not discharged. It is only before the last rinse referred to as the final rinse that the cushion of air is discharged.

Advantageously, the level of the water at the end of rinsing with water alone lies at least 5 cm below the level of the upper edge of the washing water collection weir, preferably between 5 cm and 10 cm below said level.

Having repeated the draining, bubbling and rinsing sequence a number of times, a final rinse is carried out after the air from the cushion situated under the floor has been discharged, this final rinsing corresponding to 5 to 10 covolumes and the dirty washing water is discharged to a sludge treatment facility.

The washing method is as applicable to a filter of horizontal axis as it is to a filter of vertical axis.

The invention also relates to a filtration installation, particularly for seawater, implementing the method defined hereinabove, and comprising a filter having at least two layers of filter media which are supported by a floor equipped with nozzles, a pipeline equipped with a valve for admitting air underneath the floor and a pipeline equipped with a valve for admitting backwash water underneath the floor, a pipeline equipped with a valve for discharging the filtered water underneath the floor, a branch to a discharge, which branch is equipped with a valve used to drain the filter down to a level determined by two level sensors and an air extraction pipeline situated at a high point of the filter and equipped with a valve, a raw water inlet pipeline equipped with a valve, at the top part of the filter, above the layer of media, and a pipeline for discharging the washing water collected by at least one weir at the top part of the filter and equipped with a valve, this installation comprising a valve control unit for performing the steps of the method defined hereinabove.

Apart from the provisions set out hereinabove, the invention consists in a certain number of other provisions that will be covered more explicitly hereinafter with reference to one exemplary but entirely nonlimiting embodiment described with reference to the attached drawings. In these drawings.

Figure 1:
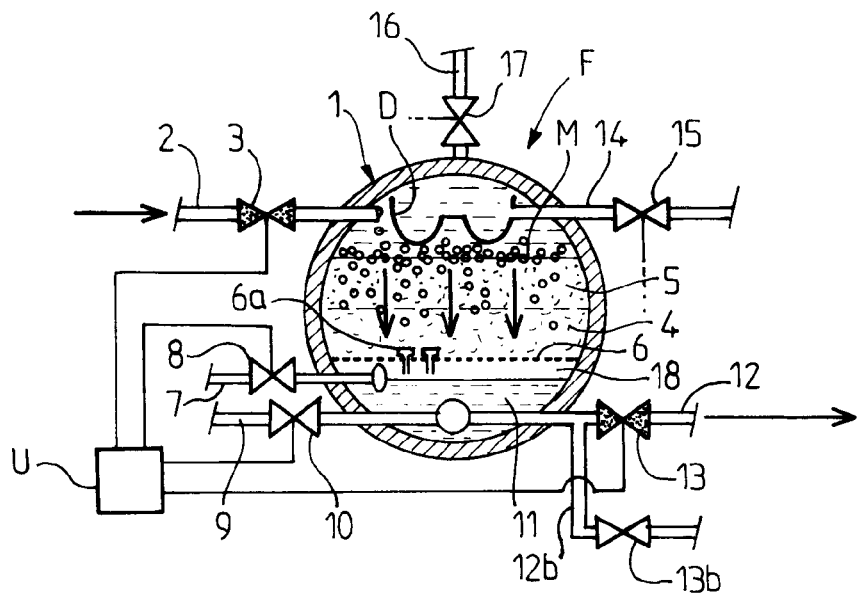
FIG. 1 is a schematic vertical section through a horizontal cylindrical filter, for implementing the method of the invention, during the step of injecting under pressure the flocculated raw water that is to be treated.

With reference to the drawings, notably to FIG. 1, there may be seen a pressurized filter F for seawater or, more generally, for raw water containing components that have a tendency to form cakes or "mud balls" that agglomerate generally at the surface of the filter.

According to the example depicted in the drawings, the filter F is a horizontal filter comprising a cylindrical jacket 1, of horizontal axis, into which jacket the raw water, having undergone a flocculation treatment, is introduced under pressure via a pipeline 2 equipped with a valve 3 opening at the top of the cross section of the jacket 1. All the valves mentioned in the description are of the remote controlled electrovalve type.

The filter comprises at least two layers of filter media. In the example depicted, the filter F is a two-layer filter comprising a lower layer 4 of sand and an upper layer 5 of anthracite. The layers are supported by a horizontal floor 6 comprising passage orifices situated in the bottom part of the filter and extending in cross section along a chord of the circular cross section. The floor is equipped with nozzles 6a allowing the injection of air and/or of washing water. The air is admitted at the bottom part, underneath the floor 6, via a pipeline 7 equipped with a valve 8, whereas the washing water is introduced, in the bottom part of the filter, by a pipe 9 equipped with a valve 10.

The raw water introduced into the top part of the filter flows from the top to the bottom through, the layers 5 and 4 then through the orifices in the floor 6, and in the bottom part forms a layer 11 of filtered water which can be discharged via a pipe 12 equipped with a valve 13. A branch 12b, equipped with a valve 13b, is connected to the pipe 12 upstream of the valve 13, to discharge to a discharge.

The washing water injected in the bottom part of the filter rises from the bottom to the top through the layers 4 and 5, performing a backwash, is collected at the top by at least one weir D and is discharged from the top part of the filter by a pipe 14 connected to the weir and equipped with a valve 15.

The air is discharged from the top part of the filter by a pipe 16 equipped with a valve 17.

During the pressurized filtration operation illustrated in FIG. 1, the raw water is admitted by the pipe 2, the valve 3 being open as is the filtered-water discharge valve 13. The other valves are closed. The upper part of the filter, situated above the filtering layers, is filled with pressurized raw water.

The water flows through the layers of the filter and the filtered water collected at the bottom part is discharged by the pipe 12.

The seawater contains components such as alginates which agglomerate with particles of media and form cakes or "mud balls" M generally at the surface of the filter. These cakes M may have dimensions of around 2 cm×4 cm with a thickness of around 0.5 cm and increasingly slow down the filtration as the number of them increases.

The washing method according to the invention makes it possible to reduce the volume of the cakes M by subjecting them to a phenomenon of friction by bringing them into contact with air in order to dry them, and to discharge the fines formed toward the upper part of the filter.

For the washing, in a first, preparation, step a/, the raw water inlet valve 3 is closed then, after a certain time, so is the valve 13. The pressure is then reduced, notably by opening the valves 15 and 17. The filter cake is destroyed by breaking it up by sending a small quantity of water countercurrentwise, namely from the bottom to the top, by opening the valve 10, for example for a few seconds. At the end of this step the valves 15 and 17 are kept open, or are opened, until the end of the final rinse.

During the next step b/, the water level falls as filtered water is discharged through the pipe 12b and the valve 13b, which has been opened, until it reaches a level 5 to 10 cm above the medium, which level is detected by two level sensors. The valve 13b is then closed.

For the next step c/, the flushing-air inlet valve 8 is opened (see FIG. 2) and air alone is thus blown in under pressure at the bottom part of the filter, this air passing from bottom to top through the layers 4 and 5 of the filter and causing the cakes M to be reduced, particularly by friction, to fine particles.

The duration of this injection of air, or bubbling, is short, notably less than 10 min (generally 5 to 6 minutes), after which time the valve 8 closes again.

Such bubbling for a relatively short length of time, lasting a few minutes, makes it possible to avoid or limit the mixing of the media of the two layers 4 and 5.

Figure 2:
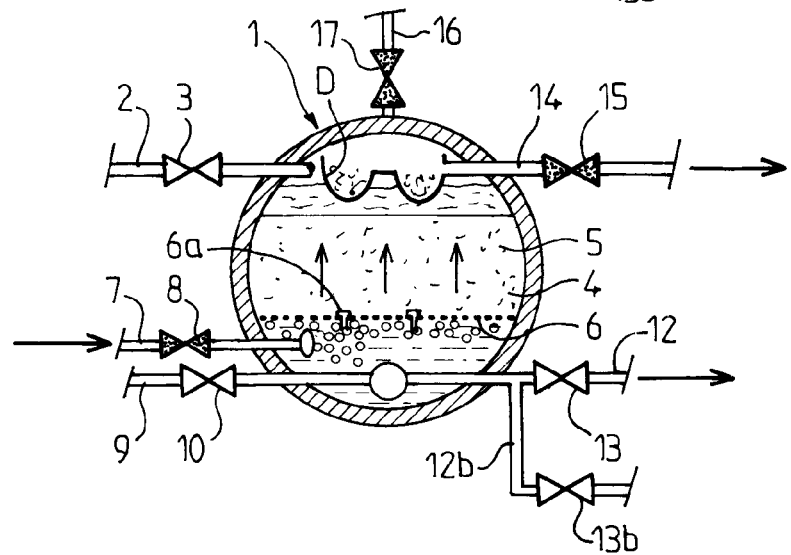
FIG. 2 shows, in a similar way to FIG. 1, a bubbling step with air alone being blown in under pressure at the bottom part of the filter.

During the bubbling operation c/, as illustrated in FIG. 2, the washing-water discharge valve 15 is open as is the air discharge valve 17.

By aeration the injected compressed sir allows the cakes to dry out making them easier to turn into fine particles.

Figure 3:
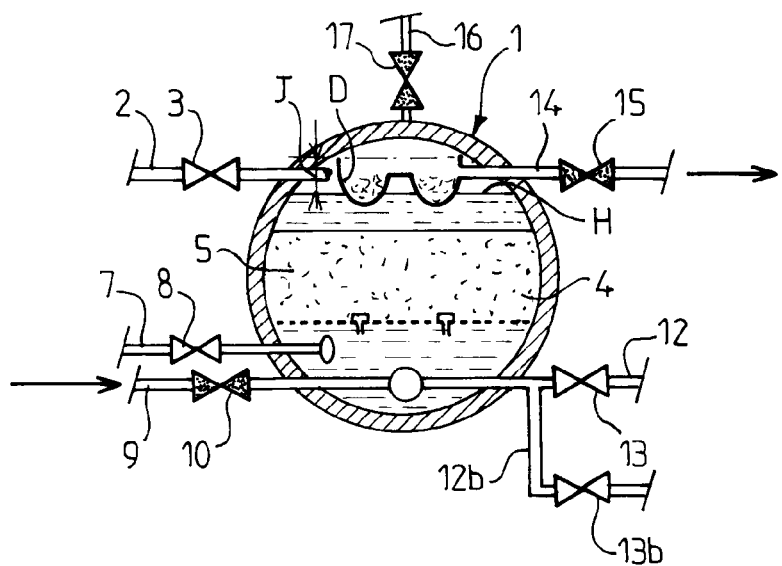
FIG. 3 shows, in a similar way to FIG. 1, a step of rinsing for a brief period.

The next step d/ consists in a short rinse with water alone, from the bottom to the top, by opening the backwash water valve 10 and the washing-water discharge valve 15 (see FIG. 3). The air discharge valve 17 is also open, while the other valves are closed. This step d/ allows the sand and anthracite media to separate and the layers 4 and 5 to be reconstituted without appreciable mixing. Furthermore, the rinsing allows the particles derived from the cakes M to rise to the surface.

The rinsing in step d/ is carried out for a length of time that is short enough that the water level B (figure 3) remains below the level of the upper edge of the washing water collection weir D. Advantageously, the water level H at the end of a rinse is a distance J of at least 5 cm and preferably of between 5 and 10 cm below the level of the upper edge of the weir. This then avoids the loss of media that may be carried away by the washing stream into the discharge pipe 14.

The duration of a rinse with water alone is short, generally less than 60 s and notably of the order of 30 to 45 s.

During the next step e/, the water is drained off for filter again, discharging the water using the pipe 12b, the valve 13b being open, until a level of 5 to 10 cm above the medium.

Steps c/, d/ and e/ are repeated at least once and preferably twice.

Not until just before the final rinse is the sir from the cushion 18, situated underneath the floor 6, discharged via an outlet that has not been depicted, so as to avoid a mixing of air bubbles and rinse water during the rinse.

When the sequences involving short-duration rinsing, generally lasting less than 60 s, have been carried out, a final rinse is performed, the air from the cushion 18 being discharged. During this rinse, a quantity of backwash water corresponding to several covolumes (a covolume corresponding to the total volume of sand and anthracite medium), notably 5 to 10 covolumes, is passed through, with the dirty washing water being discharged to a sludge treatment facility by the pipe 14, the valve 15 of which is open. The backwash water inlet valve 10 is also open as is the air discharge valve 17, while the other valves are closed.

An installation for implementing the method comprises the filter F, the various pipelines and valves, and a valve control unit U (FIG. 1) for performing the sequences of opening and closing of the valves, in accordance with the method.

The solution of the invention thus consists in draining the filter, bubbling air alone, then rinsing for a short duration with water alone in order to avoid any overspill onto the discharge weirs or channels and the loss of medium. The cushion of air 18 under the floor 6 is removed just before the final rinse only.

This sequence of draining, bubbling and short-duration rinsing is repeated a number of times, two repeats generally sufficing.

The steps of preparing for the washing of the filter mean that depressurization can be achieved, the filter cake broken up, and the water level lowered in order to avoid any loss of medium during the step of bubbling with pressurized air.

The invention, is as applicable to filters which are horizontal (total height from the drain valve to the vent 4 m max., for transport and manufacturing reasons) as it is to filters which are vertical (for economic reasons).

The method requires no modification to equipment and makes it possible to improve the efficiency of the filter, notably by increasing the filtration time.

The method can work with an atmospheric filter.

The invention claimed is:

1. A method for washing a filter having at least two layers of filter media for seawater, a bottom part of the filter being supported by a floor comprising passage orifices and provided with nozzles that allow an injection of washing water and/or air, the seawater flowing from a top part of the filter to the bottom part of the filter through the at least two layers of filter media, and a treated water being collected at the bottom part of the filter, which at the top part comprises at least one weir for collecting the washing water, wherein the following successive steps are carried out:
   (a) a preparation step in which seawater inlet is closed and the filter, where the filter operates under pressure, is depressurized;
   (b) a water level in the filter is lowered;
   (c) air alone is blown under pressure into the bottom part of the filter, this air passing from the bottom part of the filter to the top part of the filter through the at least two layers of the filter and causing the cakes to be reduced to particles;
   (d) rinsing is carried out using water alone as the washing water, the washing water passing from the bottom part of the filter to the top part of the filter, allowing the filter media to separate and causing the particles to rise to a surface, a water-rinsing time being short enough that the water level remains below an upper edge of the at least one weir for collecting the washing water so that the washing water does not enter the at least one weir;
   (e) the washing water is emptied out of the filter by a discharge at the bottom part of the filter;
   (f) steps (c), (d), and (e) are repeated at least once,
   and a final rinsing is performed by passing through a quantity of backwash water which is injected at the bottom part of the filter and discharged from the top part of the filter by a pipe.

2. The method as claimed in claim 1, steps(c), (d), and (e) are repeated at least twice.

3. The method as claimed in claim 1, wherein the duration for which air alone is blown into the bottom part of the filter is less than 10 min.

4. The method as claimed in claim 1, wherein the duration of the rinsing with water alone is less than 60 s.

5. The method as claimed in claim 1, wherein prior to each rinsing with water alone, a cushion of air under the floor is not eliminated, this cushion being eliminated just prior to the final rinse.

6. The method as claimed in claim 1, wherein the level of the water at the end of rinsing with water alone remains at least 5 cm below the upper edge of the at least one weir for collecting the washing water.

7. The method as claimed in claim 6, wherein the level of the water at the end of rinsing with water alone remains between 5 cm and 10 cm below the upper edge of the at least one weir for collecting the washing water.

8. The method as claimed in claim 1, wherein, having repeated steps (c), (d), and (e) a number of times, a final rinse the final rinsing is carried out after the air from the cushion a cushion of air situated under the floor has been discharged, this final rinsing corresponding to 5 to 10 covolumes and the dirty washing water is discharged to a sludge treatment facility.

9. The method as claimed in claim 4, wherein the duration of the rinsing with water alone is approximately 45 s.

* * * * *